United States Patent [19]

Kuhr et al.

[11] Patent Number: 5,131,443

[45] Date of Patent: Jul. 21, 1992

[54] TREAD DESIGN FOR A PNEUMATIC VEHICLE TIRE

[75] Inventors: Wolfgang Kuhr; Norbert Zinnen, both of Aachen, Fed. Rep. of Germany

[73] Assignee: Uniroyal Englebert Reifen GmbH, Aachen, Fed. Rep. of Germany

[21] Appl. No.: 639,652

[22] Filed: Jan. 10, 1991

[30] Foreign Application Priority Data

Jan. 10, 1990 [DE] Fed. Rep. of Germany ....... 9000203

[51] Int. Cl.$^5$ ............................................. B60C 11/04
[52] U.S. Cl. ................................. 152/209 R; D12/149
[58] Field of Search ........... 152/209 R, 209 D, 209 B; D12/146, 147, 149

[56] References Cited

U.S. PATENT DOCUMENTS

| 1,127,517 | 2/1915 | Richardson | 152/209 R |
| 3,457,981 | 7/1969 | Verdier | 152/209 B |
| 4,057,089 | 11/1977 | Johannsen | 152/209 R |
| 4,687,037 | 8/1987 | Pfeiffer et al. | 152/209 R |

FOREIGN PATENT DOCUMENTS

| 0880418 | 3/1943 | France | 152/209 R |
| 0090405 | 4/1988 | Japan | 152/209 D |
| 2229974 | 10/1990 | United Kingdom | 152/209 R |

OTHER PUBLICATIONS

"Der Reifen der nicht baden geht"; Auto Bild, Oct. 22, 1990.
"Die ganz andere Problemlosung"; Produkte, Oct. 1990, pp. 94-98.

Primary Examiner—Michael W. Ball
Assistant Examiner—Nancy T. Krawczyk
Attorney, Agent, or Firm—Robert W. Becker & Associates

[57] ABSTRACT

A tread design for a pneumatic tire of radial construction for high-speed vehicles is provided. The tread design comprises profiled elements that are steeply oriented in the circumferential direction at an angle to the equatorial plane of the tire and are arranged in the shape of V's. The profiled elements extend in a continuous manner from a central portion of the tread into shoulder regions of the tire and are angled-off at a bend region in these shoulder regions. Respective continuous, inclined grooves that proceed from the central portion of the tread to the shoulder regions are formed between the profile elements. Respective fork-shaped elements are provided in the shoulder regions in the vicinity of ends of the profiled elements remote from the central portion of the tread, with each fork-shaped element being provided with at least one short groove that opens into the shoulder region away from the bend region thereof.

9 Claims, 2 Drawing Sheets

TREAD DESIGN FOR A PNEUMATIC VEHICLE TIRE

BACKGROUND OF THE INVENTION

The present invention relates to a tread design for a pneumatic tire of radial construction for high-speed vehicles, with the tire having a height-to-width ratio of $\leq 0.6$. These vehicle tires have a belt-reinforced tread portion with a tread design that is tied to the direction of rotation. The tread design comprises profiled elements that are steeply oriented in the circumferential direction at an angle to the equatorial plane of the tire and are arranged in the shape of V's, with the tips of the V's facing in the direction of normal travel of the tire. The profiled elements extend in a continuous manner from the central portion of the tread into shoulder regions of the tire, with the profiled elements being angled-off at a bend region in the shoulder regions in a direction that is more or less parallel to the axis of the tire. Respective continuous inclined grooves are formed between the profiled elements and proceed from the central portion of the tread to the shoulder regions, with these inclined grooves being steeply oriented in the central portion of the tread relative to the equatorial plane of the tire, and in the shoulder region being oriented in the direction of the axis of the tire.

Tread designs are known where continuous inclined grooves extend from the shoulder regions of the tire to the central portion of the tread, where they end in a blind manner. Tread designs are also known where the inclined grooves of one half of the tread are connected with the inclined grooves of the other half of the tread in the central portion of the tire. With wide tires where the inclined grooves are arranged in the shape of V's, in order to have an effective drainage and to prevent aquaplaning during a braking operation, it is expedient to provide a steep orientation of the inclined grooves in the circumferential direction. At the same time, continuous drainage via the inclined grooves into the open shoulder regions of the tire should be ensured. Furthermore, for reasons of wear and noise emission at high vehicle speeds, not only in the central portion but also in the shoulder regions wide tires should have a relatively high positive profile proportion in the form of profiled elements. The tread profile should be such that the requirements for low wear and a low noise level can also be fulfilled.

It is therefore an object of the present invention to embody and dispose the profiled elements in the shoulder regions of the tire in such a way that it is possible to achieve an effective drainage, a relatively high resistance to skidding in the wet, and a relatively quiet operation, as well as a uniform and low wear over the width of the tread.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
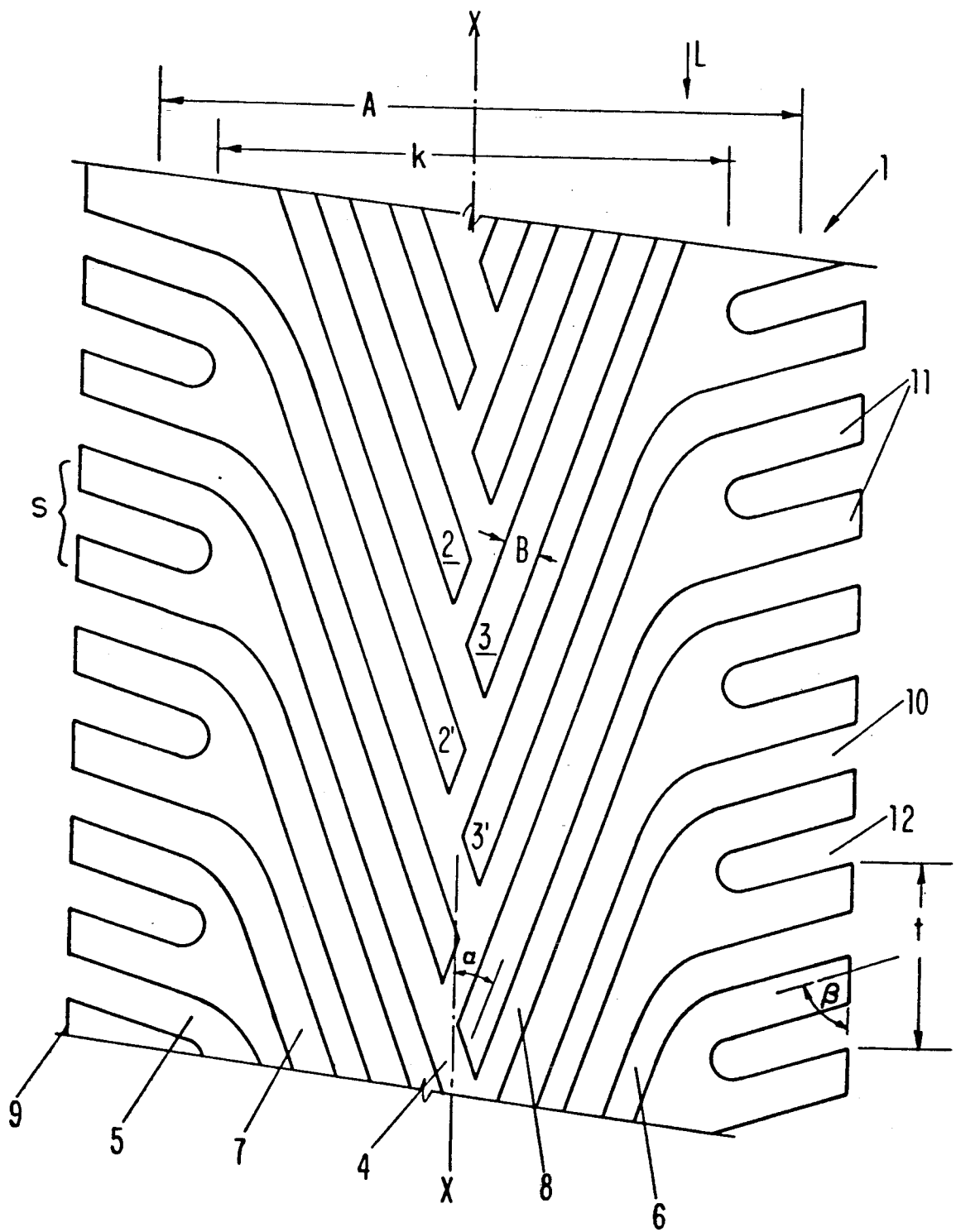
FIG. 1 illustrates one exemplary embodiment of the inventive tread design, which shows steeply oriented profiled elements that are arranged in the shape of V's.

The tread design of the present invention is characterized primarily by respective fork-shaped means that are disposed in the shoulder regions in the vicinity of ends of the profiled elements. The tread design furthermore comprises rune-shaped profiled elements that are disposed in the shape of V's at a steep orientation angle of from 5° to 25°, whereby tips of the profiled elements in the central portion of the tread are offset relative to one another in the circumferential direction of the tire.

The shoulder regions, in the vicinity of the ends of the profiled elements remote from the central portion of the tread, are provided with respective portions comprising a plurality of ribs, and at least one blind groove, that have a short axial length and that alternate in a circumferential direction, thereby producing respective fork shaped means in the shoulder regions.

The configuration of the fork-shaped means in the shoulder region is such that at least one additional blind-ended shoulder groove is provided.

The rune-shaped profiled elements, along with the fork-shaped shoulder elements, form a wide tire profile that is resistant to wet skidding, is effective with respect to drainage, and is resistant to wear. The continuous inclined grooves, which extend parallel to the steeply oriented profiled elements and communicate in the central portion of the tread with inclined grooves of the other half of the tread with which they respectively abut, ensure a relatively effective drainage. Thus, continuity is ensured from the steeply disposed inclined grooves from the central portion of the tread to the angled-off arrangement that extends essentially parallel to the axis of the tire. As a consequence of this inventive tread design, if the wheels become locked during a braking operation water that is present can still flow off into the inclined grooves, thus preventing the danger of aquaplaning during a braking operation.

The width of the fork-shaped profiled elements and the rune-shaped profiled elements is a function of the circumferential interval or division of the tread profile. The width of the rune-shaped profiled elements and the width of the inclined grooves are such that a negative/positive ratio is provided where the positive proportion is approximately 60%. This has a positive impact upon the development of noise. As a result of the fork-shaped elements, the shoulder profile provides a high proportion of favorably low shoulder wear and a favorably high water-removal capability.

Pursuant to further specific embodiments of the present invention, it is possible to additionally provide as part of the forked shoulder configuration a further blind-ended groove and/or a short rib.

It is to be understood that the inventive features also encompass the reverse configuration, where instead of profiled elements profiled grooves are provided, and in place of the profiled grooves, profiled elements are provided.

Further specific features of the present invention will be described in detail subsequently.

DESCRIPTION OF PREFERRED EMBODIMENTS

Referring now to the drawings in detail, the tread design 1 of FIG. 1, which is intended for a wide tire having a height-to-width ratio of $\leq 0.6$, comprises a plurality of shaped or profiled elements 2 and 3 that are arranged in the shape of V's. The profiled elements 2 are disposed in one half of the tread, while the profiled elements 3 are disposed in the other half of the tread.

Disposed in the vicinity of the equatorial plan x—x are the starts or tips 2', 3'of the profiled elements 2, 3. In the circumferential direction, these profiled element starts are offset relative to one another and as a result form a continuous, zig-zagged circumferential groove 4 that is disposed in the central portion of the tread. The direction of normal travel is designated by the reference symbol L, and the width of the tire support is designated by the reference symbol A.

The profiled elements 2, 3 are disposed at a relatively steep angle of 15°, relative to the equatorial plane x—x. As a consequence, the tread design for the wide tire has a very distinct or pronounced circumferential orientation. This tread design is provided in the central portion with a system of elongated continuous ribs that form a significant constituent of the profiled elements 2 3. The profiled elements have a rune-shaped configugation; in other words, they have the shape of a slender, elongated rib with a bend region 5 or 6 disposed at the end. Proceeding from these bend regions, the profiled elements extend at an angle β of 70° and at a slight angle to a line parallel to the axis of the tire. The distance "k" between the bend regions 5 and 6 of the tread is, for wide tires having a height-to-width ratio of 0.6, between 60 and 70% of the tire support width A; in the illustrated embodiment, the distance "k" is 67% of the support width A.

Formed between respective profiled elements 2 3 are elongated, continuous profiled grooves 7 and 8 that have a relatively steep circumferential orientation. These profiled grooves proceed from the common zig-zagged circumferential groove 4, extend linearly and steeply oriented at the angle α to the bend regions 5 or 6, and extend from here at the angle β, and at an angle to a line that is parallel to the axis of the tire, and into the open tire shoulders 9 or 10.

The design of the tread in the shoulder portion is split by a forking into two ribs 11, between which is disposed a short, blind-ended groove 12.

The width B of the profiled elements 2, 3 is, for example, 13 to 20 mm. The width S of the shoulder design is up to 3 times greater than the width B. The groove width is, for example, 8 to 11 mm, and is a function of, among other things, the angle α and the circumferential interval or division "t".

As a consequence of the inventive tread design for wide tires having a height-to-width ratio of 0.6 and less, where the tread design is formed of steep profiled elements that are disposed in the shape of V's and have a shoulder bend, on the one hand a very great resistance to skidding in the wet and an effective drainage are provided, and on the other hand a very great wear stability or resistance and a relatively low development and emission of noise are provided.

Figure 2:
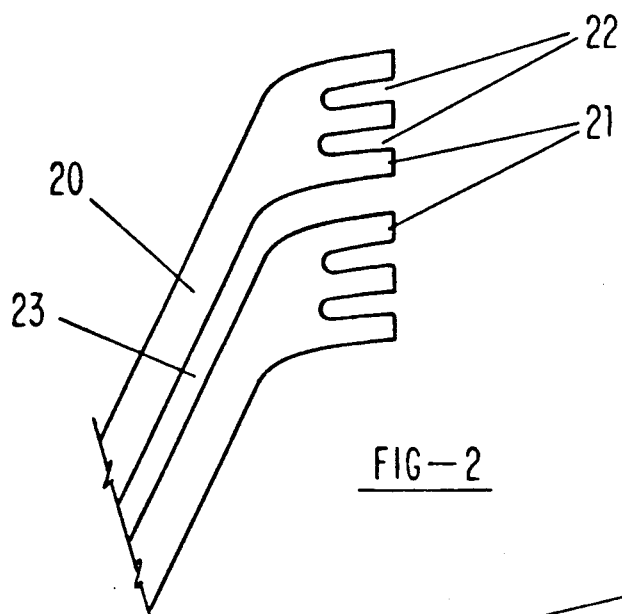
FIG. 2-4 illustrate further exemplary embodiments of the shoulder profiling of the inventive tread design.

In order to further improve the drainage and the strength in the tire shoulders, as shown in the embodiment of FIG. 2 each of the profiled fork portions 21 of the tread design 20 is provided with two short grooves 22 that are provided in addition to the inclined groove 23.

Figure 3:
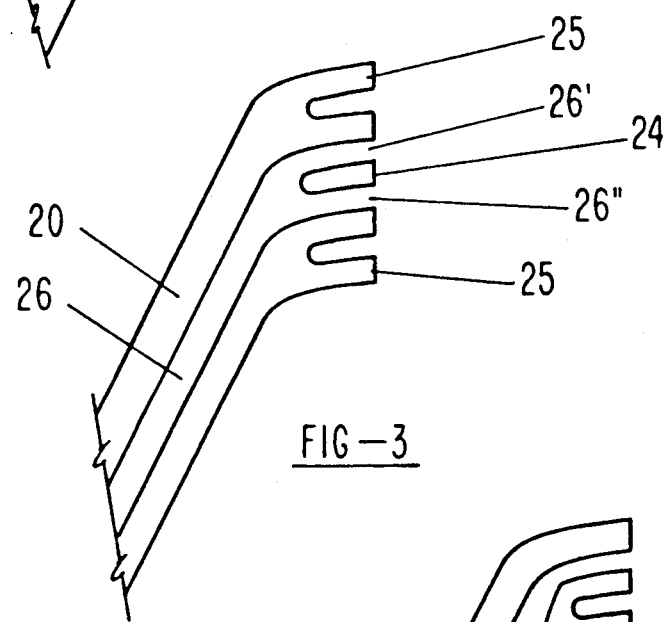

As shown in the embodiment of FIG. 3, disposed between adjacent profiled fork portions 25 are respective short ribs 24. This short rib 24 divides the inclined groove 26 into two partial grooves 26', 26". The short rib 24 proceeds from the bend regions and extends into the shoulders.

Figure 4:
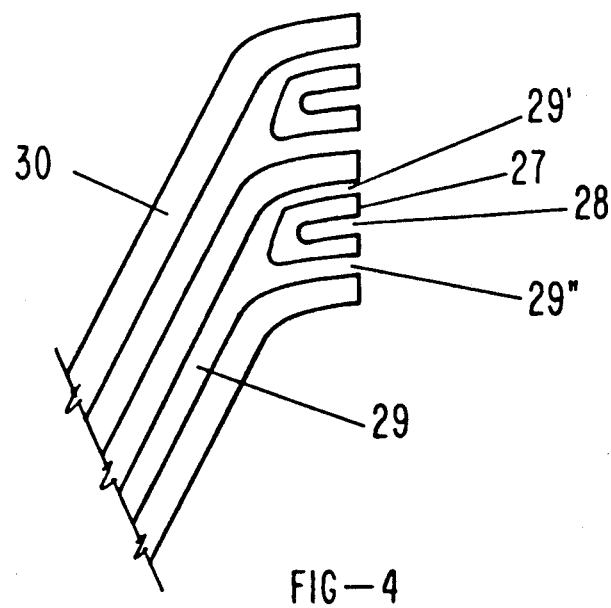

In the embodiment of FIG. 4, rune-shaped profiled elements SO are provided that have no fork portions in the shoulder. In this embodiment, a construction that corresponds to a forked member is provided via the interposition of a short rib 27 that has a short groove 28. In this way, the inclined groove 29 is again divided into two partial grooves 29', 29". If necessary, various ones of the profiled shoulder fork configurations can be combined in order to further improve the drainage and the shoulder wear properties. It is to be understood that where required for the profile division, the width B of the rune-shaped profiled elements can vary from element to element.

The present invention is, of course, in no way restricted to the specific disclosure of the specification and drawings, but also encompasses any modifications within the scope of the appended claims.

What we claim is:

1. In a pneumatic tire of radial construction for high-speed vehicles, with said tire having a height-to-width ratio of $\leq 0.6$, and furthermore having a belt-reinforced tread portion with a tread design that is tied to the direction of rotation and comprises profiled elements that are steeply oriented in the circumferential direction at an angle to an equatorial plane of said tire and are arranged in the shape of V's, with said profiled elements extending in a continuous manner from a central portion of said tread into shoulder regions of said tire, with said profiled elements being angled-off at a bend region in said shoulder regions in the direction of an axis of said tire, and with respective continuous, inclined grooves that proceed from said central portion of said tread to said shoulder regions being formed between said profiled elements, the improvement wherein:

respective fork-shaped means are provided in said shoulder regions in the vicinity of ends of said profiled elements remote from said central portion of said tread, with each of said fork-shaped means being provided with at least one short groove that opens into said shoulder region away from said bend region thereof.

2. A tread design according to claim 1, which includes a zig-zagged circumferential groove that is disposed in said central portion of said tread and from which said profiled elements and inclined grooves extend toward either side.

3. A tread design according to claim 1, in which said profiled elements are rune-shaped and, between said central portion of said tread and said bend regions, extend at an angle of 5° to 25° relative to said equatorial plane, in the region of which starting portions of said profiled elements have the shape of V's, with said starting portions being staggered relative to one another in a circumferential direction.

4. A tread design according to claim 1, in which said fork-shaped means are formed by said ends of said profiled elements that are remote from said central portion of said tread.

5. A tread design according to claim 4, in which each of said fork-shaped ends of said profiled elements is provided with one short groove that opens into said shoulder region.

6. A tread design according to claim 4, in which each of said fork-shaped ends of said profiled elements is provided with two short grooves that open into said shoulder region.

7. A tread design according to claim 4, which includes, between each of said fork-shaped ends of said profiled elements, at least one short rib that is disposed in said inclined groove and extends from said bend region into said shoulder region.

8. A tread design according to claim 1, in which said fork-shaped means are formed by separate elements respectively disposed in said inclined grooves between each of said ends of said profiled elements that are remote from said central portion of said tread, with each said separate element being provided with one short groove that opens into said shoulder region.

9. A tread design according to claim 1, in which said fork-shaped means are formed not only by ends of said profiled elements that are remote from said central portion of said tread, but also by separate elements respectively disposed between each of said fork-shaped ends of said profiled elements.

* * * * *